United States Patent
Kenney et al.

(10) Patent No.: US 9,775,147 B2
(45) Date of Patent: *Sep. 26, 2017

(54) MASTER STATION AND METHOD FOR HIGH-EFFICIENCY WI-FI (HEW) COMMUNICATION USING A MULTIPLE ACCESS TECHNIQUE

(71) Applicant: Intel IP Corporation, Santa Clara, CA (US)

(72) Inventors: Thomas J. Kenney, Portland, OR (US); Eldad Perahia, Portland, OR (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/392,232

(22) PCT Filed: Dec. 12, 2013

(86) PCT No.: PCT/US2013/074645
§ 371 (c)(1),
(2) Date: Dec. 23, 2015

(87) PCT Pub. No.: WO2015/076855
PCT Pub. Date: May 28, 2015

(65) Prior Publication Data
US 2016/0143010 A1    May 19, 2016

Related U.S. Application Data

(60) Provisional application No. 61/906,059, filed on Nov. 19, 2013.

(51) Int. Cl.
*H04W 72/04* (2009.01)
*H04W 4/00* (2009.01)
(Continued)

(52) U.S. Cl.
CPC ........ *H04W 72/044* (2013.01); *H04B 7/0413* (2013.01); *H04B 7/0452* (2013.01);
(Continued)

(58) Field of Classification Search
CPC ... H04W 4/00; H04W 56/00; H04W 56/0035; H04W 84/12; H04B 7/0404; H04B 7/0452; H04B 7/0684; H04L 27/26; H04L 27/261
See application file for complete search history.

(56) References Cited

U.S. PATENT DOCUMENTS 9,439,161 B2 * 9/2016 Vermani ............... H04B 7/0452
9,462,504 B2 * 10/2016 Stephens ............. H04W 52/241
(Continued)

FOREIGN PATENT DOCUMENTS

CN    105340351 A    2/2016
WO    WO-2013058512 A1    4/2013
(Continued)

OTHER PUBLICATIONS

"International Application Serial No. PCT/US2013/074645, International Preliminary Report on Patentability mailed Jun. 2, 2016", 7 pgs.
(Continued)

*Primary Examiner* — Ayaz Sheikh
*Assistant Examiner* — Debebe Asefa
(74) *Attorney, Agent, or Firm* — Schwegman Lundberg & Woessner, P.A.

(57) ABSTRACT

Embodiments of a master station and method for communicating with a plurality of high-efficiency Wi-Fi (HEW) devices in a wireless network are generally described herein. In some embodiments, the master station may contend for a wireless medium during a contention period to receive control of the medium for an HEW control period, and
(Continued)

transmit an HEW control and schedule transmission at the beginning of the HEW control period. The HEW control and schedule transmission may include a schedule indicating channel resources for communications with the HEW devices during the HEW control period in accordance with a non-contention based multiple access technique. The channel resources indicated in the HEW control and schedule transmission may comprise subspaces within a wideband legacy channel bandwidth. Transmissions on HEW channels during the HEW control period may have symbol times aligned within each legacy channel for legacy-device coexistence.

20 Claims, 3 Drawing Sheets

(51) Int. Cl.

| | | |
|---|---|---|
| *H04L 5/00* | (2006.01) | |
| *H04L 27/26* | (2006.01) | |
| *H04B 7/0452* | (2017.01) | |
| *H04B 17/336* | (2015.01) | |
| *H04J 11/00* | (2006.01) | |
| *H04L 29/06* | (2006.01) | |
| *H04W 24/02* | (2009.01) | |
| *H04W 56/00* | (2009.01) | |
| *H04W 52/02* | (2009.01) | |
| *H04B 7/0413* | (2017.01) | |
| *H04W 74/04* | (2009.01) | |
| *H04W 84/12* | (2009.01) | |

(52) U.S. Cl.
CPC ............ *H04B 17/336* (2015.01); *H04J 11/00* (2013.01); *H04L 5/005* (2013.01); *H04L 5/0007* (2013.01); *H04L 5/0048* (2013.01); *H04L 27/2601* (2013.01); *H04L 27/2602* (2013.01); *H04L 27/2613* (2013.01); *H04L 27/2695* (2013.01); *H04L 69/22* (2013.01); *H04W 4/008* (2013.01); *H04W 24/02* (2013.01); *H04W 52/0216* (2013.01); *H04W 52/0219* (2013.01); *H04W 56/002* (2013.01); *H04W 72/0413* (2013.01); *H04W 72/0453* (2013.01); *H04W 74/04* (2013.01); *H04J 2011/0096* (2013.01); *H04W 84/12* (2013.01); *Y02B 60/50* (2013.01)

(56) References Cited

U.S. PATENT DOCUMENTS

| | | |
|---|---|---|
| 2008/0175265 A1 | 7/2008 | Yonge et al. |
| 2009/0016306 A1 | 1/2009 | Wang et al. |
| 2010/0008318 A1 | 1/2010 | Wentink et al. |
| 2011/0268094 A1 | 11/2011 | Gong et al. |
| 2012/0327870 A1 | 12/2012 | Grandhi et al. |
| 2013/0229996 A1 | 9/2013 | Wang et al. |
| 2013/0265965 A1 | 10/2013 | Amini et al. |
| 2014/0301383 A1 | 10/2014 | Sohn, III et al. |

FOREIGN PATENT DOCUMENTS

| | | |
|---|---|---|
| WO | WO-2013/066363 A1 | 5/2013 |
| WO | WO-2015/076855 A1 | 5/2015 |

OTHER PUBLICATIONS

"International Application Serial No. PCT/US2013/074645, International Search Report mailed Aug. 18, 2014", 3 pgs.
"International Application Serial No. PCT/US2013/074645, Written Opinion mailed Aug. 18, 2014", 5 pgs.
"European Application Serial No. 13897918.2, Extended European Search Report dated Jul. 17, 2017", 11 pgs.
Jinsoo, Choi, "Discussion on OFDMA in HEW ; 11-13-1382-00-0hew-di scussion-on-ofdma-inhew", (LG Electronics): IEEE Draft; 11-13-1382-00-0HEW-Discussion-0N-0FDMA-IN-HEW, IEEE-SA Mentor, Piscataway, NJ USA vol. 802.11 HEW, (Nov. 12, 2013), 1-11.
Koskela, Timo, et al., "Discussion on Potential Techniques for HEW", in: IEEE P802.11—High Efficiency WLAN Study Group, [Online] Retrieved from the Internet : <http://www.ieee802.org/11/Reports/hew_update.html>, (Jul. 15, 2013), 13 pgs.

* cited by examiner

| | BW | $T_{DFT}$ | $T_{GI}$ | $T_{SYM}$ | $N_T$ | $N_D$ | $N_P$ | $N_G$ |
|---|---|---|---|---|---|---|---|---|
| HEW CHANNELS | 80 | 3.2μSEC | 0.8μSEC | 4.0μSEC | 256 | 234 | 8 | 11 |
| | 40 | 3.2μSEC | 0.8μSEC | 4.0μSEC | 128 | 108 | 6 | 11 |
| | 20 | 3.2μSEC | 0.8μSEC | 4.0μSEC | 64 | 52 | 4 | 7 |
| | 10 | 3.2μSEC | 0.8μSEC | 4.0μSEC | 32 | 24 | 2 | 5 |
| | 5 | 3.2μSEC | 0.8μSEC | 4.0μSEC | 16 | 11 | 2 | 3 |
| | 2.5 | 3.2μSEC | 0.8μSEC | 4.0μSEC | 8 | 5 | 1 | 2 |
| | 1.0 | 3.2μSEC | 0.8μSEC | 4.0μSEC | 4 | 2 | 1 | 1 |
FIG. 4
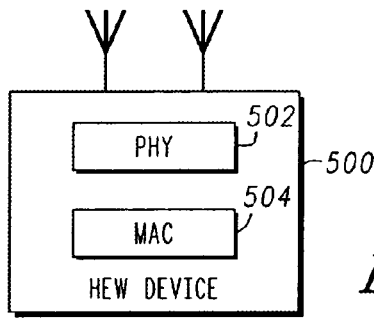
FIG. 5
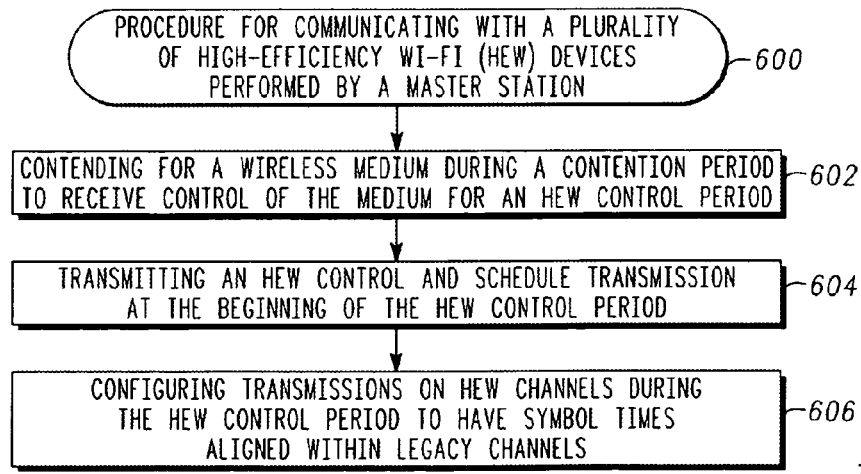
FIG. 6

MASTER STATION AND METHOD FOR HIGH-EFFICIENCY WI-FI (HEW) COMMUNICATION USING A MULTIPLE ACCESS TECHNIQUE

PRIORITY CLAIM

This application is a U.S. national stage application filed under 35 U.S.C. §371 from International Application Serial No. PCT/US2013/074645, which was filed Dec. 12, 2013, and published as WO2015/076855 on May 28, 2015, and which claims the benefit of priority to U.S. Provisional Patent Application Ser. No. 61/906,059, filed Nov. 19, 2013, which applications and publication are incorporated by reference as if reproduced herein and made a part hereof in their entirety, and the benefit of priority of each of which is claimed herein.

TECHNICAL FIELD

Embodiments pertain to wireless networks. Some embodiments relate to Wi-Fi networks and networks operating in accordance with one of the IEEE 802.11 standards. Some embodiments relate to high-efficiency wireless or high-efficiency Wi-Fi (HEW) communications.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements. The frame structure used for conventional and legacy IEEE 802.11 communications including very-high throughput (VHT) communications may be less suitable for such high-density deployment situations. A recently-formed study group for Wi-Fi evolution referred to as the IEEE 802.11 High Efficiency Wi-Fi (HEW) study group (SG) is addressing these high-density deployment scenarios.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that can coexist with legacy devices.

BRIEF DESCRIPTION OF THE DRAWINGS

FIG. 4 is a table illustrating parameters for HEW communications in accordance with some embodiments;

FIG. 5 illustrates and HEW device in accordance with some embodiments; and

FIG. 6 is a procedure for communicating with a plurality of HEW devices performed by a master station in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
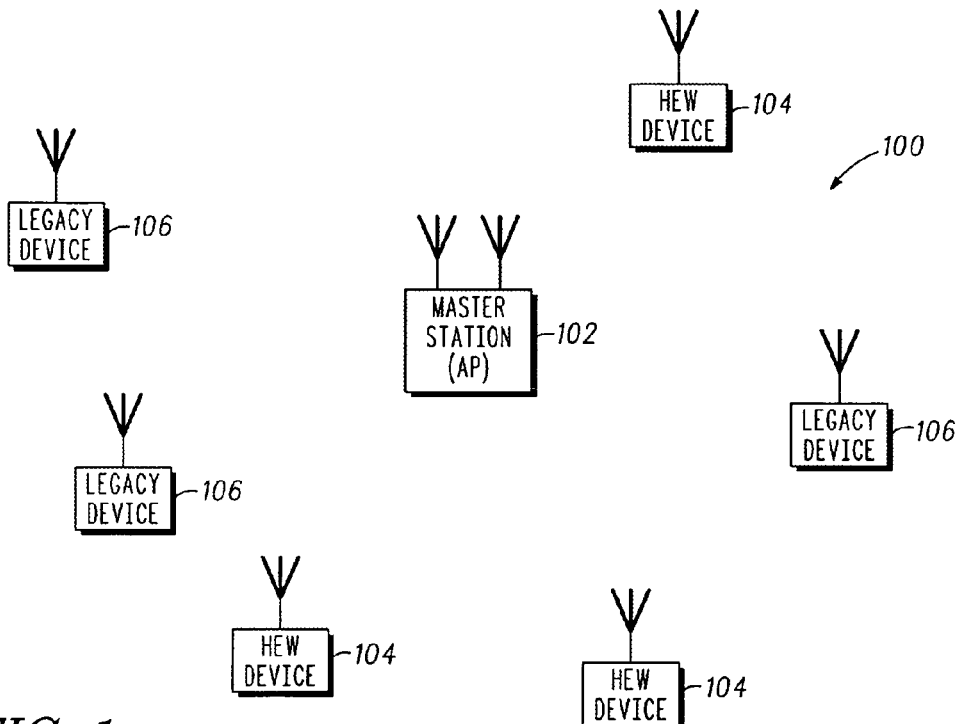
FIG. 1 illustrates a High Efficiency Wi-Fi (HEW) network in accordance with some embodiments.

FIG. 1 illustrates a High Efficiency Wi-Fi (HEW) network in accordance with some embodiments. HEW network 100 may include a master station (STA) 102, a plurality of HEW devices 104 (HEW stations), and a plurality of legacy devices 106 (legacy stations). The master station 102 may be arranged to communicate with the HEW devices 104 and the legacy devices 106 in accordance with one or more of the IEEE 802.11 standards.

In accordance with embodiments, the master station 102 may include physical layer (PHY) and medium-access control layer (MAC) circuitry which may be arranged to contend for a wireless medium during a contention period to receive exclusive control of the medium for an HEW control period (i.e., a TXOP), and transmit an HEW control and schedule transmission at the beginning of the HEW control period. The HEW control and schedule transmission may include at least a schedule indicating channel resources for communications with at least some of the HEW devices 104 during the HEW control period. During the HEW control period, the HEW devices 104 may communicate with the master station 102 in accordance with a non-contention based multiple access technique. This is unlike conventional Wi-Fi communications in which devices communicate in accordance with a contention-based communication technique, rather than a multiple access technique.

As discussed in more detail below, during the HEW control period, transmissions by the master station 102 or HEW devices 104 on HEW channels are configured to have symbol times aligned within each legacy channel. This may allow the communications with HEW devices 104 to coexist with the communications of legacy devices 106.

In some embodiments, the multiple access technique used during the HEW control period may be an orthogonal frequency division multiple access (OFDMA) technique and the HEW control period may be an HEW OFDMA control period, although this is not a requirement. In some embodiments, the multiple access technique may be a time-division multiple access (TDMA) technique or a frequency division multiple access (FDMA) technique. In some embodiments, the HEW control and schedule transmission may be a master-sync transmission.

The master station 102 may also communicate with legacy devices 106 in accordance with legacy IEEE 802.11 communication techniques. In some embodiments, the master station 102 may also be configurable communicate with HEW devices 104 outside the HEW control period in accordance with legacy IEEE 802.11 communication techniques, although this is not a requirement.

Figure 2:
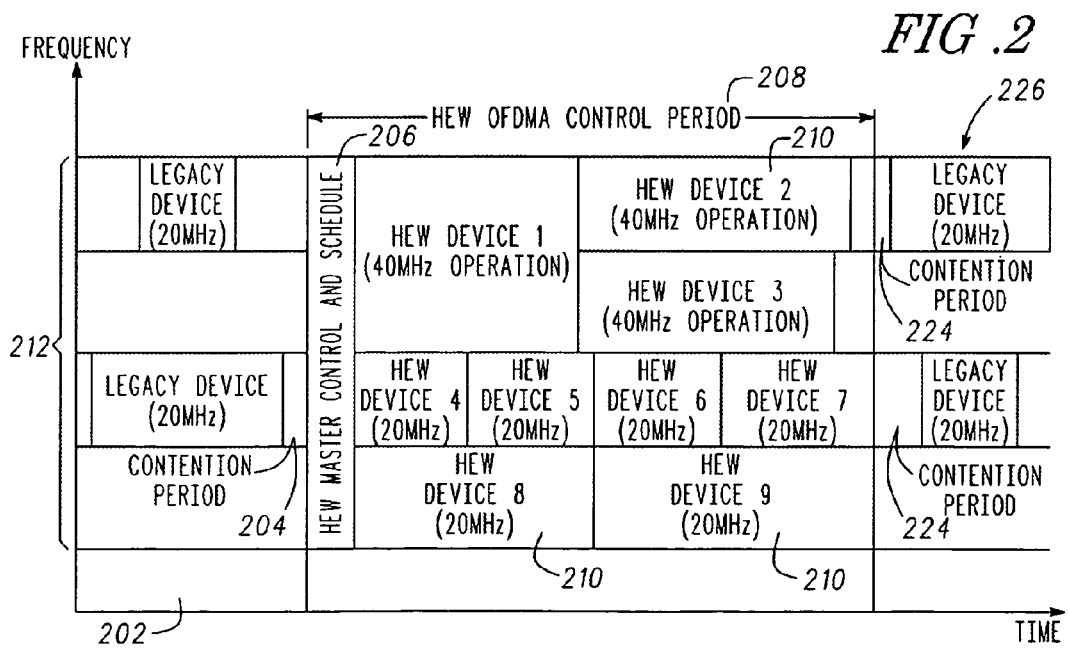
FIG. 2 illustrates the time-frequency space during which HEW network communications may take place in accordance with some embodiments.

FIG. 2 illustrates the time-frequency space during which HEW network communications may take place in accordance with some embodiments. The master station 102 (FIG. 1) may be arranged to contend for a wireless medium during a contention period 204 to receive exclusive control of the medium for an HEW control period 208. The master station 102 may also be arranged to transmit an HEW control and schedule transmission 206 at the beginning of the HEW control period 208. As mentioned above, the HEW control and schedule transmission 206 may include at least a schedule indicating channel resources for at least some of the communications with the HEW devices 104 (FIG. 1) during the HEW control period 208.

In these embodiments, the channel resources indicated in the HEW control and schedule transmission 206 comprise subspaces 210 within a legacy channel bandwidth, such as wideband legacy channel bandwidth 212. The subspaces 210 may comprise time-frequency resources for HEW channels having HEW channel bandwidths. In these embodiments, the master station 102 may also be arranged to communicate with each scheduled HEW device 104 on one of the HEW channels 214 within the indicated channel resources (i.e., an indicated subspace 210) during the HEW control period 208.

In these embodiments, the channel resources that are indicated may comprise frequency bandwidth and time-slot information. Each subspace 210 may be defined by a particular frequency band within one or more legacy channel bandwidths (e.g., 20 MHz) and defined as particular OFDM symbols or time slots.

FIG. 2 shows an example of an HEW OFDMA allocation using HEW channels with a 10 MHz minimum channel bandwidth. In these example embodiments, there are a total of sixteen HEW compliant devices that are allocated channel resources within one of the subspaces 210. Embodiments described in more detail below include other minimum bandwidth channel allocations.

In some embodiments, the master station 102 may be arranged to transmit HEW frames to the HEW stations 104 during the HEW control period 208. In other embodiments, the master station 102 may be arranged to receive HEW frames from the HEW stations 104 during the HEW control period 208. In some embodiments, the master station 102 may be arranged to transmit HEW frames to the HEW stations 104 during an initial HEW control period and receive HEW frames from the HEW stations 104 during a subsequent HEW control period. In some embodiments, the master station 102 may be arranged to transmit HEW frames to the HEW stations 104 and receive HEW frames from the HEW stations 104 during the same HEW control period 208.

In the example illustrated in FIG. 2, legacy devices 106 (FIG. 1) are illustrated as communicating on 20 MHz legacy channels outside the HEW control period 208 (i.e., during periods 202 and 226), the wideband legacy channel bandwidth 212 is illustrated as an 80 MHz bandwidth comprising four 20 MHz legacy channels. The HEW channels are illustrated as being aligned with one or more 20 MHz legacy channels. In these embodiments, transmissions on any of the HEW channels are configured to have symbol times aligned within each legacy channel. Accordingly, when a legacy device 106 detects transmissions on a legacy channel using a signal-detection technique, the transmissions will appear as a legacy transmission causing a legacy device 106 to defer transmission. These embodiments are discussed in more detail below.

Figure 3:
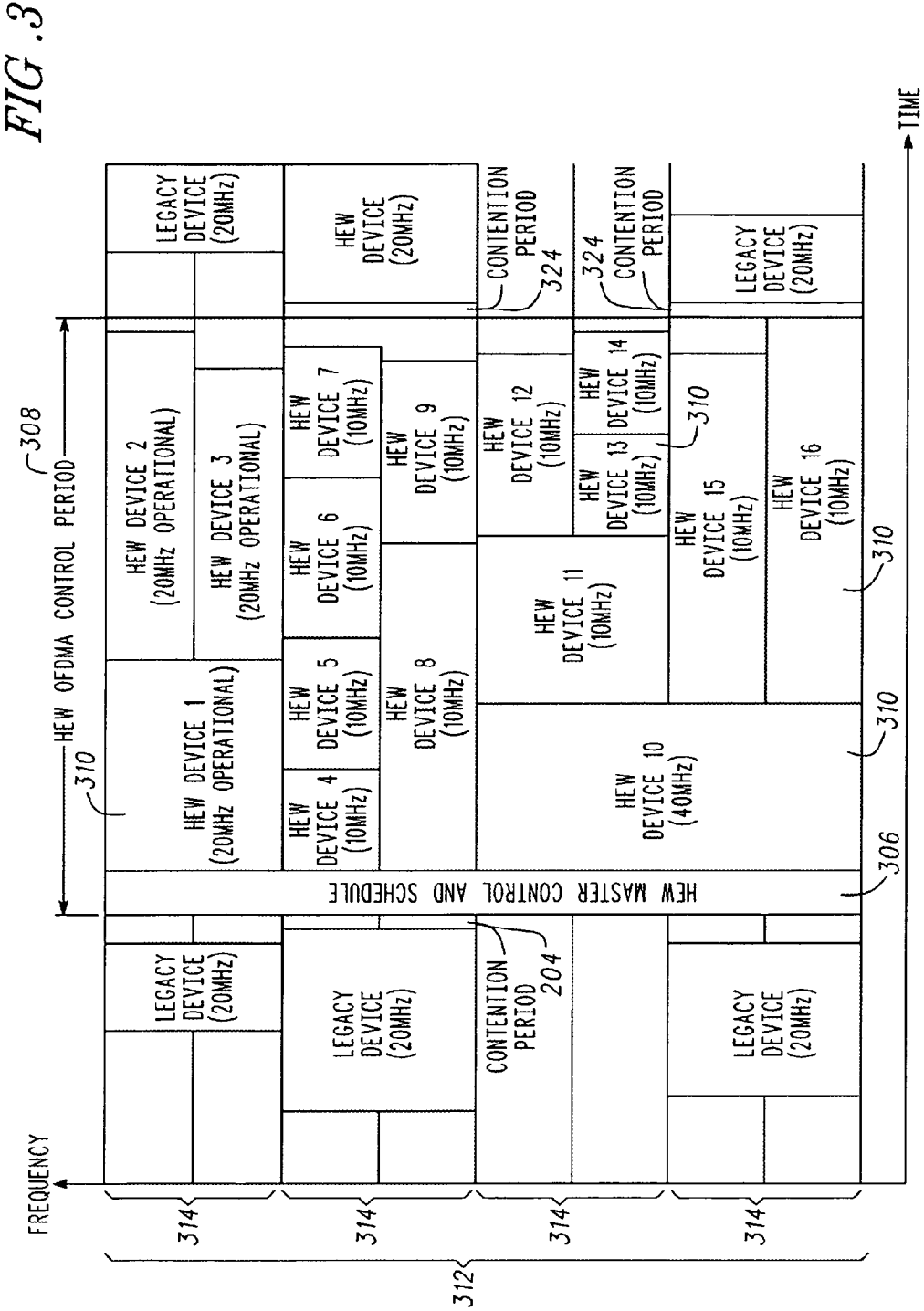
FIG. 3 illustrates the time-frequency space during which HEW network communications may take place in accordance with some alternate embodiments.

FIG. 3 illustrates the time-frequency space during which HEW network communications may take place in accordance with some alternate embodiments. The master station 102 (FIG. 1) may be arranged to contend for a wireless medium during a contention period 204 to receive exclusive control of the medium for an HEW control period 308. The master station 102 may also be arranged to transmit an HEW control and schedule transmission 306 at the beginning of the HEW control period 308 and after contention period 204. The channel resources indicated in the HEW control and schedule transmission 306 comprise subspaces 310 within a wideband legacy channel bandwidth 312. The subspaces 310 may comprise time-frequency resources for HEW channels having HEW channel bandwidths.

In the example illustrated in FIG. 3, wideband legacy channel 312 may comprise four legacy 20 MHz channels 314. Some of the HEW channels may be narrower in bandwidth (i.e., 10 MHz) than a legacy channel 314. Some of the HEW channels may be wider in bandwidth (i.e., 40 MHz) than a legacy channel 314. In these embodiments, transmissions on each of the HEW channels are configured to have symbol times aligned within an associated legacy channel 314. Accordingly, when a legacy device 106 detects transmissions on a legacy channel 314 using a signal-detection technique, the transmissions will appear as a legacy transmission causing a legacy device 106 to defer its transmission.

In these embodiments, the HEW channels within a particular legacy channel 314 bandwidth may also be arranged have substantially identical waveform characteristics as a 20 MHz legacy channel to allow mid-amble signal detection by a legacy device 106 to cause a legacy device 106 to defer transmission. In these embodiments, a combination of HEW channels, which may together have a bandwidth of a legacy channel, may be arranged to appear as a legacy channel to a legacy device. For example, two 10 MHz HEW channels are arranged to appear as a single 20 MHz legacy channel 314 since their symbol times may be aligned.

In accordance with embodiments, the symbol times of transmission on the HEW channels may be aligned to within a fraction of a guard interval for each 20 MHz legacy channel 314. In some embodiments, in addition to having their symbol times aligned, the waveforms transmitted on the HEW channels with each legacy channel bandwidth may also configured to have the same subcarrier spacing and the same packet structure, including guard time, as a legacy waveform that would be transmitted on a legacy channel 314. This may allow the communications with HEW devices 104 to coexist with the communications of legacy devices 106.

In some embodiments, the HEW channel bandwidths may comprise a minimum of one or more of 10 MHz, 5 MHz, 2.5 MHz, and/or 1 MHz sub-portions of a 20 MHz legacy channel bandwidth to define respectively 10 MHz, 5 MHz, 2.5 MHz, and 1 MHz HEW channels. The transmissions on the 10 MHz, 5 MHz, 2.5 MHz, and 1 MHz HEW channels may also be configured to have symbol times aligned within each 20 MHz legacy channel 314.

In some embodiments, the waveforms generated by the HEW devices 104 may be arranged to appear as a legacy bandwidth transmission. In these embodiments, signal detection of a number of the HEW channels with a legacy channel bandwidth by a legacy device 106 causes the legacy device to interpret the number of the HEW channels as a busy legacy channel and accordingly, to defer transmission and provide for coexistence.

In accordance with some other embodiments, the HEW channel bandwidths may also comprise bandwidths of one or more of 40 MHz, 80 MHz, 160 MHz and 320 MHz to define 40 MHz, 80 MHz, 160 MHz and 320 MHz HEW channels, respectively. In these embodiments, since the HEW channels are wider than a 20 MHz legacy channel, their symbol times may already be aligned (within a 20 MHz bandwidth of a legacy channel) allowing these wider HEW channels to be detected by a legacy device since the HEW channels have the same subcarrier spacing and packet structure, including guard time, as a legacy waveform.

In some embodiments, the HEW channels may also utilize 20 MHz channel bandwidths (e.g., as illustrated in FIG. 2). Similarly, a 20 MHz HEW channel would be able to be detected by a legacy device as symbol times would be aligned within a 20 MHz bandwidth.

In accordance with some embodiments, the HEW control period 208/308 may comprise a time-frequency space within IEEE 802.11 legacy bandwidth 212/312 arranged for OFDMA communications. In some embodiments, the HEW control period 208/308 may be a transmission opportunity (TXOP) acquired by the master station 102. In these embodiments, HEW devices 104 are assigned or allocated time-frequency resources for communicating during the HEW control period 208/308 in accordance with an a multiple access technique (e.g., OFDMA) and HEW devices 104 do not need to contend for the channel, as with conventional contention-based IEEE 802.11 communications.

In accordance with some embodiments, the wideband legacy channel bandwidth 212/312 comprises at least two or more adjacent 20 MHz bandwidth blocks that define one or more 20 MHz channels, one or more 40 MHz channels, one or more 80 MHz channels or one or more 160 MHz channels. The master station 102 may arranged to contend for the wideband legacy channel bandwidth 212/312 comprising at least two or more adjacent 20 MHz bandwidth blocks and preferably four 20 MHz bandwidth blocks. The HEW control and schedule transmission 206 may be transmitted by the master station 102 on the at least two or more adjacent 20 MHz bandwidth blocks comprising the wideband legacy channel bandwidth 212.

In these embodiments, a conventional legacy channel may be a 20 MHz channel and wideband legacy channels may include 40 MHz channels, 80 MHz channels and a 160 MHz channel (i.e., per IEEE 802.11ac). In the example illustrated in FIG. 2, the HEW control and schedule transmission 206 is transmitted over a bandwidth of 80 MHz, comprising four 20 MHz channels and the HEW control period 208 has a bandwidth of 80 MHz. In the example illustrated in FIG. 3, the control and schedule transmission 306 is also transmitted over a bandwidth of 80 MHz, comprising four 20 MHz legacy channels and the HEW control period 308 also has a bandwidth of 80 MHz. In other embodiments, the HEW control and schedule transmission 206/306 may be transmitted over bandwidths of 40, 60, 80, 160 or 320 MHz and the HEW control period 208/308 may have corresponding bandwidths of 40, 60, 80, 160 or 320 MHz. In some embodiments, the HEW control and schedule transmission 206/306 may be transmitted over a 20 MHz bandwidth and the HEW control period 208/308 may have corresponding 20 MHz bandwidth.

In accordance with some embodiments, the master station 102 may contend with one or more legacy devices 106 for control of the medium. The HEW devices 104 may refrain from contending for the medium (e.g., when operating in HEW mode and/or because they are HEW devices) and wait for a HEW control and schedule transmission 206/306 by the master station 102. The legacy devices 104 may refrain from contending for channel access during the HEW control period 208/308 (i.e., since legacy devices 106 can detect HEW transmissions).

In some embodiments, after the HEW control period 208, the master station 102 may contend for access to the wireless medium during a subsequent contention period 224/324 in accordance with a collision avoidance or collision detection technique. In some embodiments, the master station 102, as well as legacy stations 106, may contend for channel access (during contention periods 204/304 and 224/324) in accordance with a carrier sense multiple access with collision avoidance (CSMA/CA) protocol (with the optional RTS/CTS technique) or a carrier sense multiple access with collision detection (CSMA/CD) protocol.

FIG. 4 is a table illustrating parameters for HEW communications in accordance with some embodiments. Table 400 illustrates examples of parameters for HEW channels of various bandwidths in accordance with some embodiments. Table 400 illustrates parameters for HEW channels of 80 MHz bandwidths, 40 MHz bandwidths, 20 MHz bandwidths, 10 MHz bandwidths, 5 MHz bandwidths, 2.5 MHz bandwidths, and 1 MHz bandwidths. For each HEW bandwidth 402, table 400 includes a discrete-Fourier transform time ($T_{DFT}$) 404, a guard interval time ($T_{GI}$) 406, symbol time ($T_{SYM}$) 408, the number of subcarriers ($N_T$) 410, the number of data subcarriers ($N_D$) 412, the number of pilot subcarriers ($N_P$), and the number of subcarriers allocated to guard ($N_G$) 416. Other parameters may also be used for HEW channels. HEW channels of 160 and 320 may also be included. In these embodiments, the symbol timing and subcarrier spacing of the HEW channels allow the HEW channels to appear as a legacy channel within each 20 MHz legacy channel bandwidth.

For example, $N_T=32$ is selected for the 10 MHz waveform in order to maintain the same sub-carrier spacing as the IEEE 802.11a/g/n/ac legacy systems and therefore maintain the same symbol timing. For the 5 MHz waveform a value of $N_T=16$ may selected to provide the same sub-carrier spacing and therefore symbol timing as the legacy systems.

FIG. 5 illustrates and HEW device in accordance with some embodiments. HEW device 500 may be an HEW compliant device that may be arranged to communicate with one or more other HEW devices, such as HEW devices as well as communicate with legacy devices. HEW device 500 may be suitable for operating as master station 102 (FIG. 1) or an HEW device 104 (FIG. 1). In accordance with embodiments, HEW device 500 may include, among other things, physical layer (PHY) 502 and medium-access control layer (MAC) 504. PHY 502 and MAC 504 may be HEW compliant layers and may also be compliant with one or more legacy IEEE 802.11 standards. PHY 502 may be arranged to transmit HEW frames within HEW channels in accordance with the parameters of table 400 (FIG. 4).

In accordance with some embodiments, the MAC 504 may be arranged to contend for a wireless medium during a contention period to receive control of the medium for an HEW control period and the PHY 102 may be arranged to transmit an HEW control and schedule transmission at the beginning of the HEW control period as discussed above.

In some embodiments, the master station 102 may allocate resources to HEW devices 104 for use during the HEW control period based on criteria that includes one or more of SNR, configuration, throughput, amount of data to send, a fairness criteria and quality-of-service requirements. The master station 102 may determine whether stations are HEW devices 104 or legacy devices 106 at the time of association with the master station 102 through a capability exchange. In some embodiments, the master station 102 may notify HEW devices 104 that the Control period 208 is to be used for communications in accordance with a multiple access technique. In some embodiments, the master station 102 may use the Control period 208 when there is congestion and communicate in accordance with conventional Wi-Fi techniques (e.g., CSMA/CA) otherwise. In some embodiments, mapping of a control signal may be performed at the beginning of the transmission to list devices that are to communicate during the Control period 208, although the scope of the embodiments is not limited in this respect.

In some embodiments, the HEW device 500 may be configured to communicate using OFDM communication signals over a multicarrier communication channel. In some embodiments, HEW device 500 may be configured to receive signals in accordance with specific communication standards, such as the Institute of Electrical and Electronics Engineers (IEEE) standards including IEEE 802.11-2012 and/or 802.11n-2009 standards and/or proposed specifications for WLANs including proposed HEW standards, although the scope of the invention is not limited in this respect as they may also be suitable to transmit and/or receive communications in accordance with other techniques and standards. In some other embodiments, HEW device 500 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 500 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 500 may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, one primary use case in HEW is dense deployments with many devices trying to access the medium with moderate data rates, therefore methods to allow more or less simultaneous access devices is needed. The current IEEE 802.11ac specification allows for up to 160 MHz of bandwidth with 8 simultaneous MIMO streams. The focus for HEW is to use that fat pipe (wide bandwidth) to provide access to many devices. Some of the embodiments described herein create an OFDMA structure as an extension to IEEE 802.11ac as part of the IEEE 802.11 HEW study group. These embodiments attempt to reuse at least some of the basic physical layer functionality outlined in the previous releases of the IEEE 802.11 Wi-Fi standards. In some embodiments, large bandwidths may be allocated to the master controller 102 which may then allocate subspaces 210/310 of bandwidth to HEW devices 104. In some embodiments, at least 80 MHz is used. This larger bandwidth may be used by the master controller 102 over a controlled period of time to allocate (schedule) smaller bandwidths to HEW devices 104. This may give the master station control to schedule devices over frequency and time. In some embodiments, several minimum bandwidth size allocations (e.g., 1, 2.5, 5, 10 and 20 MHz) are provided. The allocation of bandwidth may be done in a manner that also allows it to be backwards compatible with IEEE 802.11ac devices in that the waveform for the proposed sub-bands will allow the CCA detection in the middle the Control period 208. This approach allows both HEW and legacy devices, if they wake-up in the middle of the transmission, to perform a guard interval detection.

In accordance with embodiments, the new OFDMA technique that is described herein may improve overall system efficiency. In addition, embodiments provide coexistence with legacy and HEW devices allowing an HEW system to be efficient when legacy devices are on the channel. Legacy devices are likely to be deployed for many years to come. In some embodiments, an OFDMA structure is overlaid on the current Wi-Fi system.

In some embodiments, a group of HEW compliant devices may operate over a wideband channel. To provide with backwards compatibility, the wideband channels will be 40, 80, 160 or 320 MHz. In the case of 160 MHz and 320 MHz, the allocation can be either contiguous or noncontiguous.

Some embodiments are backwards compatible for coexistence with legacy devices and to reuse to a large extent the hardware of the legacy systems. In some embodiments, the master station 102 may use either 40/80 or 160 MHz as the control bandwidth to schedule the users. Higher bandwidths (e.g., 320 MHz) that may also be used. In the embodiments illustrated in FIG. 2, users are allocated in blocks of 20 MHz up to and including the maximum bandwidth under control by the master station 102. FIG. 2 shows a scenario with master station 102 controlling 80 MHz of bandwidth. The figure shows a snapshot in time of a possible allocation where a total of nine HEW devices share the bandwidth over the HEW control period 208. As can be seen in the FIG. 2, the HEW master station 102 sends out a control and schedule transmission 206 that has as a minimum a schedule for each of the HEW devices 104 to receive and then know what frequency and time slot will be used for that device. Legacy devices are using the medium before and after the HEW control period 208. The HEW master is responsible for contending for the medium with the legacy devices. The other HEW devices wait for the HEW master control and schedule transmission and therefore do not contend for the medium. It doesn't mean that a HEW device has to be part of an HEW OFDMA transmission; it could also contend for the medium like a legacy device and act like a legacy device. The approach here doesn't limit that possibility. The more HEW devices using the HEW control period, the better the overall system efficiency.

While the embodiments illustrated in FIG. 2 bring benefit to Wi-Fi in dense deployments, it is possible to take this a step further. In other embodiments illustrated in FIG. 3, smaller bandwidths are used subdivide the Time/Frequency space. Additionally, the approach affords coexistence with legacy devices. In these embodiments, several new bandwidths are designed for HEW compliant devices. FIG. 3 illustrates 5 and 10 MHz bandwidths. In these embodiments, a waveform is generated that appears to be a traditional wider bandwidth Wi-Fi signal to the legacy systems. For instance, the bandwidth is divided into 10 MHz bandwidth signals, but when a legacy device attempts to do a mid-packet detect over 20 MHz, the composite signal will look like another legacy device is transmitting and therefore the device will properly defer. The same would hold true for 5 MHz bandwidth signals as well. A group of 5 MHz signals appear as one 20 MHz transmission to a legacy device and it properly defers. These embodiments allow an HEW system to have many more users sharing the medium, and at the same time afford protection for those devices when legacy devices are also operating. Smaller bandwidths may also be used.

In these embodiments, the smaller bandwidth waveform is designed to have the same waveform characteristics as the legacy systems (e.g., the same symbol time and thus sub-carrier spacing). Additionally, the packet structure may be the same as that of the legacy systems, including guard times. To achieve this, 5 and 10 MHz waveforms would have a sub-carrier spacing of 312.5 kHz which equates to a total of 16 and 32 sub-carriers respectively. Achieving this along with having the same symbol timing (GI time as well), allows legacy devices to detect the composite signal. For example, if we assume a legacy device wakes up in the middle of a HEW OFDMA transmission, and attempts to detect a signal in a 20 MHz block it will see two 10 MHz HEW transmissions. For this example we will assume a simple case of a HEW control period using 40 MHz. For the 40 MHz there are 4 users each with 10 MHz of bandwidth. Assume the transmission is from the master to the clients. In the middle of that transmission the legacy wakes and does a GI detect on the first 20 MHz. This will consist of two of the 10 MHz signal which are time aligned, having the same OFDM symbol timing and GI length. Thus, the composite 20 MHz will appear as a single 20 MHz device from a GI detection perspective. This approach therefore achieves legacy coexistence. This provides a robust OFDMA design in the Wi-Fi system where legacy systems exist and allows those devices to detect in the middle of the OFDMA exchange. This detection level may be much lower than the energy detection level that would be used if they were not able to detect the composite signal. Without this, using the higher energy detect threshold, there would be many collisions with the OFDMA transmission, which would greatly degrade the efficiency benefits.

FIG. 6 is a procedure 600 for communicating with a plurality of HEW devices performed by a master station in accordance with some embodiments. Procedure 600 may be performed by an HEW device, such as HEW device 500 (FIG. 5).

Operation 602 comprises contending for a wireless medium during a contention period to receive control of the medium for an HEW control period.

Operation 604 comprises transmitting an HEW control and schedule transmission at the beginning of the HEW control period. The HEW control and schedule transmission may include at least a schedule indicating channel resources for communications with the HEW devices during the HEW control period in accordance with a non-contention based multiple access technique.

Operation 606 comprises configuring transmissions on HEW channels during the HEW control period to have symbol times aligned within legacy channels.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus arranged to communicate with a plurality of high-efficiency (HE) devices, the apparatus comprising:
   memory and processing circuitry configured to:
      generate a control frame to be transmitted to a plurality of stations (STAs), the control frame to trigger a response within a transmission opportunity (TXOP), the control frame to identify stations (STAs) for transmission of uplink multi-user data units within the TXOP and to allocate resources for transmission of the uplink multi-user data units, within the TXOP, by each of the identified STAs; and
      process,
   in accordance with one of a multi-user multiple-input multiple-output (MU-MIMO) or an orthogonal frequency division multiple access (OFDMA) technique, within the TXOP one or more of the uplink multi-user data units from at least some of the identified STAs.

2. The apparatus of claim 1 wherein the control frame is a downlink multi-user frame and comprises a high-efficient (HE) signal field (HE-SIG) to allocate resource units to each of the identified STAs.

3. The apparatus of claim 2 wherein the HE-SIG is configurable for transmission on one or more of a plurality of 20 MHz subbands of a 40 MHz subchannel, an 80 MHz channel, or a 160 MHz subchannel.

4. The apparatus of claim 2 wherein the allocated resources comprise resource unit assignments of less than 20 MHz for uplink OFDMA transmissions within one or more of a 20 MHz bandwidth, a 40 MHz bandwidth, an 80 MHz bandwidth, and a 160 MHz bandwidth.

5. The apparatus of claim 3 wherein the control frame comprises:
   a legacy preamble duplicated on each of the 20 MHz subbands, the legacy preamble comprising one or more legacy training fields and a legacy signal field; and a HE long training field (HE-LTF) that is orthogonal for different space-time streams.

6. The apparatus of claim 1 wherein the apparatus is further configured to obtain the TXOP prior to transmission of the control frame, wherein the control frame is configured to be transmitted within the current TXOP, and
wherein the one or more uplink multi-user data units are received within the TXOP from the STAs on the allocated resources in response to the control frame.

7. The apparatus of claim 6 wherein the apparatus is configured to contend for a wireless medium during a contention period to receive control of the medium for a control period, the control period being within the TXOP.

8. The apparatus of claim 6 wherein the apparatus is configured to receive the uplink multi-user data units within a time-frequency space arranged for OFDMA communications within the TXOP.

9. The apparatus of claim 4 wherein the resource unit assignments of less than 2.0 MHz for uplink OFDMA transmissions comprise HE channel bandwidths one or more of 10 MHz, 5 MHz, 2.5 MHz, and 1 MHz sub-portions of a 20 MHz bandwidth.

10. The apparatus of claim 2 wherein the control frame is configured to trigger a frame exchange within the TXOP, the control frame and response being part of the frame exchange, and
wherein the control frame is configurable to identify STAs for receipt of downlink multi-user data units within the TXOP.

11. The apparatus of claim 2 wherein the control frame is a downlink multi-user (MU) media-access control (MAC) protocol data unit (DL MU MPDU), and
wherein the uplink multi-user data units received from at least some of the identified STAs comprise uplink (UL) MU MPDUs (UL MU MPDUs).

12. The apparatus of claim 11 wherein the control frame is a trigger frame that allocates resources for random access transmission of the UL MU MPDUs within the TXOP by each of the identified STAs.

13. The apparatus of claim 1 wherein the apparatus is configured to be part of an access point, and
wherein the apparatus further comprises e transceiver circuitry to transmit the control frame within the TXOP and to receive the uplink multi-user data units within the TXOP.

14. The apparatus of claim 13 further comprising two or more antennas coupled to the transceiver circuitry.

15. A non-transitory computer-readable storage medium that stores instructions for execution by one or more processors to perform operations to:
generate a control frame to be transmitted to a plurality of stations (STAs), the control frame to trigger a response within a transmission opportunity (TXOP), the control frame to identify stations (STAs) for transmission of uplink multi-user data units within the TXOP and to allocate resources for transmission of the uplink multi-user data units, within the TXOP, by each of the identified STAs; and
process,
in accordance with one of a multi-user multiple-input multiple-output (MU-MIMO) or an orthogonal frequency division multiple access (OFDMA) technique, within the TXOP, one or more of the uplink multi-user data units from at least some of the identified STAs.

16. The non-transitory computer-readable storage medium of claim 15 wherein the control frame is a downlink multi-user frame and comprises a high-efficient (RE) signal field (HE-SIG) to allocate resource units to each of the identified STAs.

17. The non-transitory computer-readable storage medium of claim 16 wherein the HE-SIG is configurable for transmission on one or more of a plurality of 20 MHz subbands of a 40 MHz subchannel, an 80 MHz channel, or a 160 MHz subchannel.

18. The non-transitory computer-readable storage medium of claim 16 wherein the allocated resources comprise resource unit assignments of less than 20 MHz for uplink OFDMA transmissions within one or more of a 20 MHz bandwidth, a 40 MHz bandwidth, an 80 MHz bandwidth, and a 160 MHz bandwidth.

19. A method performed by one or more processors, the method comprising:
generating a control frame to be transmitted to a plurality of stations (STAs), the control frame to trigger a response within a transmission opportunity (TXOP), the control frame to identify stations (STAs) for transmission of uplink multi-user data units within the TXOP and to allocate resources for transmission of the uplink multi-user data units, within the TXOP, by each of the identified STAs; and
processing,
in accordance with one of a multi-user multiple-input multiple-output (MU-MIMO) or an orthogonal frequency division multiple access (OFDMA) technique, within the TXOP one or more of the uplink multi-user data units from at least some of the identified STAs.

20. The method of claim 19 wherein the control frame is a downlink multi-user frame and comprises a high-efficient (RE) signal field (HE-SIG) to allocate resource units to each of the identified STAs,
wherein the HE-SIG is configurable for transmission on one or more of a plurality of 20 MHz subbands of a 40 MHz subchannel, an 80 MHz channel, or a 160 MHz subchannel, and
wherein the control frame comprises:
a legacy preamble duplicated on each of the 20 MHz subbands, the legacy preamble comprising one or more legacy training fields and a legacy signal field; and
a HE long training field (HE-LTF) that is orthogonal for different space-time streams.

* * * * *

UNITED STATES PATENT AND TRADEMARK OFFICE
CERTIFICATE OF CORRECTION

PATENT NO. : 9,775,147 B2  
APPLICATION NO. : 14/392232  
DATED : September 26, 2017  
INVENTOR(S) : Kenney et al.

Page 1 of 1

It is certified that error appears in the above-identified patent and that said Letters Patent is hereby corrected as shown below:

On the Title Page

On page 2, item [57], "Abstract", Line 11, delete "legacy-device" and insert --legacy device-- therefor On page 2, item [56], under "Other Publications", Line 7-8, delete "11-13-1382-00-0hew-discussion-on-ofdma-inhew"," and insert --11-13-1382-00-0hew-discussion-on-ofdma-in-hew-- therefor In the Claims Column 10, Line 48, Claim 1, after "TXOP", insert --,--

Column 11, Line 20, Claim 9, delete "2.0" and insert --20-- therefor

Column 11, Line 34-35, Claim 11, after "uplink", delete "(UL) MU MPDUs"

Column 11, Line 49, Claim 15, delete "Anon-transitory" and insert --A non-transitory-- therefor Column 12, Line 12, Claim 16, delete "(RE)" and insert --(HE)-- therefor Column 12, Line 38, Claim 19, after "TXOP", insert --,--

Column 12, Line 43, Claim 20, delete "(RE)" and insert --(HE)-- therefor

Signed and Sealed this  
Fourteenth Day of April, 2020

Andrei Iancu  
*Director of the United States Patent and Trademark Office*